Patented Sept. 23, 1924.

1,509,478

UNITED STATES PATENT OFFICE.

CHARLES E. KRAUS, OF BROOKLYN, NEW YORK.

PLASTIC COMPOSITION.

No Drawing.    Application filed January 21, 1921.    Serial No. 438,997.

*To all whom it may concern:*

Be it known that I, CHARLES E. KRAUS, a citizen of the United States, residing at New York, borough of Brooklyn, in the county of Kings and State of New York, have invented certain new and useful Improvements in Plastic Compositions, of which the following is a full, clear, and exact specification.

My invention relates to plastic compositions and particularly to refractory cements or mortars, that is, those that are to be used in structures exposed to very high heat. The object of my invention is to obtain a very efficient and strong composition, and particularly cement or mortar of these characteristics, and of good heat-insulating power, with the use of a relatively small addition of a plasticizing agent.

The plasticizing agent employed in making my improved composition, cement or mortar is a type of colloidal earth of peculiar properties, the minerals of this type being known under various names, such as bentonite, ehrenbergite, damonterolite, and montmorillonite. The beneficial effect of such minerals as regards increasing the plasticity of various substances, such as kaolin, clay, bauxite, calcium carbonate, flint shale, cement rock, asbestos, has been disclosed in my pending application Serial No. 290,671, filed in the United States Patent Office on April 17, 1919, and, as to matter common to both applications, my present application may be considered a continuation of said earlier case.

The advantage of colloidal earths of the type of bentonite or its equivalents, over ordinary clays, as a bonding material, is accounted for by the fact that a relatively small amount of bentonite or its equivalent, will give the proper strength to the mixture. The bonding action or the plasticizing effect of various substances, depends, generally speaking, on the proportion of colloidal matter they contain. The superiority of bentonite and its equivalents over clays, in this respect, will be readily understood upon considering that bentonite usually contains from 85% to 95% of colloidal matter, and ehrenbergite from 70% up, whereas ordinary clays contain only from ½ of one per cent to 1½% of colloidal matter although some of the ordinary clays may have a higher percentage. In any event materials of the order of bentonite and similar materials are in a different class from the ordinary clays such as kaolin, klingenburg, etc. The admixture of bentonite or its equivalent will increase the plasticity of clay and other substances having a limited degree of plasticity, or will impart plasticity to minerals and other substances which practically lack it.

The bentonite or similar material is added to the substance to be formed therewith into a mortar or cement, in any suitable manner. Generally, all the solid ingredients of the mortar will be ground or comminuted and mixed in a dry state, the dry powder being sold to builders, etc., who would at the place of use add the proper amount of water (which any man skilled in the art will determine readily) to obtain mortar of the proper consistency. Or the user might obtain the dry ingredients separately, in powdered form, and mix them with each other and with water, in any suitable succession, at the place of use; or the mortar might be manufactured and sold in wet condition (that is, already mixed with water.)

Without desiring to restrict myself to the proportions named, I will now give six examples of mixtures which, with the addition of water or of an aqueous liquid, will yield mortars embodying the advantages of my invention.

First example:
    Ground wood_____10%
    Infusorial earth_____80%
    Bentonite_____10%

Second example:
    Carbonaceous shale_____40%
    Infusorial earth_____40%
    Bentonite_____20%

Third example:
    Cork_____10%
    Infusorial earth_____75%
    Bentonite_____15%

Fourth example:
    Decomposed carbonaceous shale____90%
    Bentonite_____10%

Fifth example:
    Infusorial earth_____90%
    Bentonite_____10%

Sixth example:
    Granite or hard flint shale_____90%
    Bentonite_____10%

The fineness to which the dry ingredients are ground may be, for instance, such that the particles will pass through a twenty mesh screen.

The improvement in plasticity secured by the addition of bentonite or similar material, is probably due to the fact that the bentonite or its equivalent fills the voids between the particles of the other ingredients of the mortar or mixture, and causes the mass, when dried, to become stronger and denser, thereby improving its bonding quality. This action is probably due to the very high percentage of colloidal matter contained in bentonite and similar materials, said percentage, as stated above, being from forty-five to about two hundred times as high as it is for ordinary clays.

The improved mortar is very strong, resistant to high temperatures (refractory) will dry properly and retain its efficiency under severe conditions of use. When it contains carbonizable carbonaceous material (such as the carbonaceous shale, the ground wood and the cork mentioned in four of the above examples), the mortar will undergo a certain change when it is exposed to high heat which will carbonize such material; this change, however, will be rather beneficial than otherwise, the heat-insulating property of the mortar remaining unimpaired, and being increased if it is changed at all.

Instead of using the mixture of aqueous liquid, bentonite or similar material, and body substance (infusorial earth, wood, shale, granite, in the examples given above, although I may use clay and other substances) as a mortar to bond bricks or other units, I may mold this mass or mixture to form refractory bricks or other articles, such molding being done under pressure if desired, and the article being dried, generally at a high temperature (baked or fired). I thus obtain slabs, blocks, bricks, or other articles for heat-insulation or heat-resisting (refractory) purposes.

While in some of the appended claims, bentonite is named as the plasticity-improving agent, I desire it to be understood that this covers equivalents, such as ehrenbergite or damonterolite.

Various modifications may be made without departing from the nature of my invention as defined in the appended claims.

I claim:

1. A refractory cement or mortar containing bentonite.
2. A refractory cement or mortar containing bentonite as its main bonding agent.
3. A refactory cement or motor containing bentonite and infusorial earth.
4. A refractory cement formed from a mixture containing bentonite, infusorial earth and carbonaceous material.
5. A refractory cement or mortar formed from a mixture containing bentonite, infusorial earth and cork.
6. A shaped article made of a plastic mass including as a plasticizing agent a finely divided mineral normally having colloidal properties much in excess of ordinary highly plastic clays and contained in the mass prior to the shaping.
7. A cement or mortar including as a plasticizing agent a finely divided mineral normally having collodial properties much in excess of ordinary highly plastic clays and included in said cement or mortar during the mixing thereof.
8. A refractory mass including a mineral having colloidal properties much in excess of ordinary clays.
9. A mass containing infusorial earth and bentonite.
10. A mass containing infusorial earth, carbonaceous material, and bentonite.
11. A mass containing infusorial earth, carbonaceous material, and a mineral having colloidal properties much in excess of ordinary clays.
12. A mass containing infusorial earth, cork, and bentonite.
13. A mass containing infusorial earth, cork, and a mineral having colloidal properties much in excess of ordinary clays.
14. As a new article of manufacture, a ceramic heat-insulating material formed from a mixture of infusorial earth, bentonite and a carbonaceous material, substantially as described.
15. As a new article of manufacture, a ceramic heat-insulating material containing an infusorial earth, bentonite and an organic combustible material, substantially as described.
16. As a new article of manufacture, a ceramic heat-insulating material containing infusorial earth, bentonite and cork, substantially as described.
17. As a new article of manufacture, a ceramic heat-insulating material containing bentonite, a carbonaceous material and a silicious earth of low apparent density, substantially as described.
18. As a new article of manufacture, a ceramic heat-insulating material containing bentonite, a silicious earth of low apparent density, and cork, substantially as described.
19. As a new article of manufacture, a shaped ceramic body containing bentonite and infusorial earth, substantially as described.
20. A refractory material containing bentonite.
21. A refractory material containing a small quantity of bentonite.
22. As a new article of manufacture, a shaped ceramic body possessing relatively high heat-insulating and refractory properties, and formed from a plastic mass consisting mainly of an amorphous silicious earth, bentonite, and a comminuted carbonaceous material, and which body has been baked at a temperature high enough to consume or decompose the carbonaceous material, substantially as described.

23. A relatively high heat insulating and refractory material formed from a plastic mass consisting mainly of an amorphous silicious earth, bentonite and a comminuted carbonaceous material which material has been subjected to a temperature high enough to comsume or decompose the carbonaceous material, substantially as described.

24. The method of forming a material of relatively high heat insulating and refractory properties which consists in forming a plastic mass consisting mainly of an amorphous silicious earth, bentonite and comminuted carbonaceous material and subjecting the material to a temperature high enough to consume or decompose the carbonaceous material substantially as described.

25. A cellular material formed of a plastic mass containing bentonite as a plasticizing agent and including artificially formed cells.

26. A refractory cellular material containing bentonite.

27. A fired cellular material containing bentonite.

28. A fired cellular refractory material containing bentonite.

29. A shaped article of material comprising cellular refractory material containing bentonite.

30. A shaped article formed of a plastic mass of cellular material containing bentonite as a plastic agent, the cells being artificially formed.

31. A shaped and fired article of manufacture comprising a cellular material containing bentonite.

32. A shaped and fired article of manufacture comprising a cellular refractory material containing bentonite.

In testimony whereof, I affix my signature.

CHARLES E. KRAUS.